US008689917B2

(12) United States Patent
Miesterfeld et al.

(10) Patent No.: US 8,689,917 B2
(45) Date of Patent: Apr. 8, 2014

(54) METHOD FOR MONITORING OPERATION OF A SHUTTER

(75) Inventors: Frederick P. Miesterfeld, Rochester Hills, MI (US); Brennen R. Waugh, Beverly Hills, MI (US); Eric R. Kolm, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 508 days.

(21) Appl. No.: 12/910,178

(22) Filed: Oct. 22, 2010

(65) Prior Publication Data

US 2012/0100790 A1 Apr. 26, 2012

(51) Int. Cl.
*B60K 11/00* (2006.01)
*B60J 1/00* (2006.01)

(52) U.S. Cl.
USPC ........................................ 180/68.1; 296/180.5

(58) Field of Classification Search
USPC .............................. 180/68.1, 68.2, 68.4, 68.6; 123/41.02–41.07; 415/121.2, 220, 222; 137/601.09, 601.14; 165/98; 296/50, 296/57.1, 180.5; 160/DIG. 1
See application file for complete search history.

(56) References Cited

U.S. PATENT DOCUMENTS

| 4,549,504 | A | * | 10/1985 | Gaines et al. | 123/41.01 |
|---|---|---|---|---|---|
| 4,779,577 | A | * | 10/1988 | Ritter et al. | 123/41.05 |
| 4,924,826 | A | * | 5/1990 | Vinson | 123/195 C |
| 4,951,224 | A | * | 8/1990 | Hokynar | 702/47 |
| 5,566,745 | A | | 10/1996 | Hill et al. | |
| 6,142,108 | A | * | 11/2000 | Blichmann | 123/41.05 |
| 6,588,380 | B2 | * | 7/2003 | Ries-Mueller | 123/41.05 |
| 6,981,915 | B2 | | 1/2006 | Moore et al. | |
| 7,082,901 | B2 | * | 8/2006 | Lolli et al. | 123/41.1 |
| 7,498,926 | B2 | * | 3/2009 | Browne et al. | 123/41.06 |
| 7,559,391 | B2 | * | 7/2009 | Bradley et al. | 180/68.1 |
| 7,766,111 | B2 | * | 8/2010 | Guilfoyle et al. | 180/68.1 |
| 8,091,668 | B2 | | 1/2012 | Amano et al. | |
| 8,161,919 | B2 | * | 4/2012 | Klotz et al. | 123/41.04 |
| 8,311,708 | B2 | * | 11/2012 | Kerns | 701/49 |
| 8,336,509 | B2 | * | 12/2012 | Kim | 123/41.04 |
| 8,517,130 | B2 | * | 8/2013 | Sakai | 180/68.1 |
| 8,573,163 | B2 | * | 11/2013 | Kinomura et al. | 123/41.08 |

FOREIGN PATENT DOCUMENTS

| DE | 3421414 C1 | 8/1985 |
|---|---|---|
| DE | 10224063 A1 | 12/2003 |
| DE | 60132929 T2 | 3/2009 |

\* cited by examiner

*Primary Examiner* — J. Allen Shriver, II
*Assistant Examiner* — James M. Dolak
(74) *Attorney, Agent, or Firm* — Quinn Law Group, PLLC

(57) ABSTRACT

A method of monitoring operation of an adjustable shutter adapted for cooling a powertrain in a vehicle includes commanding the shutter to adopt a position and assessing whether the shutter has adopted the commanded position. The method also includes generating a first signal if the shutter has adopted the commanded position, and commanding the shutter to perform a first retry to adopt the commanded position if the shutter has not adopted the commanded position. The method additionally includes generating a second signal if the shutter has adopted the commanded position on the first retry. A vehicle using a controller to perform such a method is also provided.

11 Claims, 4 Drawing Sheets

METHOD FOR MONITORING OPERATION OF A SHUTTER

TECHNICAL FIELD

The invention relates to a method for monitoring operation of a shutter.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

In motor vehicles, a shutter may be employed to control and direct a stream of light and/or air to various vehicle compartments. Therefore, a shutter may be employed to enhance comfort of vehicle passengers, as well as for cooling a range of vehicle systems.

SUMMARY

A method for monitoring operation of an adjustable shutter adapted for cooling a powertrain in a vehicle includes commanding the shutter to adopt a position and assessing whether the shutter has adopted the commanded position. The method also includes generating a first signal if the shutter has adopted the commanded position, and commanding the shutter to perform a first retry to adopt the commanded position if the shutter has not adopted the commanded position. The method additionally includes generating a second signal if the shutter has adopted the commanded position on the first retry.

The method may also include commanding the shutter to perform a second retry to adopt the commanded position if the shutter has not adopted the commanded position on the first retry.

The method may additionally include assessing whether the shutter has adopted the commanded position on the second retry and generating a third signal if the shutter has adopted the commanded position on the second retry.

Furthermore, the method may include generating a fourth signal if the shutter has not adopted the commanded position on the second retry.

According to the method, each of the acts of commanding the shutter to adopt a position, assessing whether the shutter has adopted the commanded position, generating a first signal if the shutter has adopted the commanded position, commanding the shutter to perform a first retry to adopt the commanded position if the shutter has not adopted the commanded position, and generating a second signal if the shutter has adopted the commanded position on the first retry may be accomplished by a controller.

Furthermore, each of the acts of commanding the shutter to perform a second retry to adopt the commanded position if the shutter has not adopted the commanded position on the first retry, assessing whether the shutter has adopted the commanded position on the second retry and generating a third signal if the shutter has adopted the commanded position on the second retry, and generating a fourth signal if the shutter has not adopted the commanded position on the second retry may also be accomplished by the controller. Moreover, according to the method, each of the first, second, third, and fourth signals may be stored by the controller.

The shutter may include a mechanism configured to select a position for the shutter between and inclusive of the fully-opened and the fully-closed positions in response to a command from the controller. In such a case, the method may additionally include selecting the shutter position between and inclusive of the fully-opened and the fully-closed in response to the command from the controller. The mechanism may be in operative communication with a processor, wherein the processor may be adapted to communicate to the controller whether the shutter has one of adopted and not adopted the commanded position.

The powertrain may include an internal combustion engine and a fan adapted to draw an airflow through the shutter to cool the engine. In such a case, the method may additionally include selectively turning the fan on and off and selecting the shutter positions between and inclusive of the fully-opened and the fully-closed by the controller according to a load on the engine.

The vehicle may also include a heat exchanger, a fluid circulated through the heat exchanger such that the engine is cooled by the fluid, and a sensor configured to sense a temperature of the fluid. In such case, the method may additionally include a cooling the engine by the fluid and sensing the temperature of the fluid by the sensor. Furthermore, the method may include selecting the shutter position between and inclusive of the fully-opened and the fully-closed by the controller according to the sensed temperature of the fluid.

The method may also include monitoring the ambient temperature and selecting and locking a predetermined position for the shutter in response to the ambient temperature being below a predetermined value.

The shutter may be arranged one of integral to the grille opening and adjacent to the grille opening.

A vehicle using a controller to perform such a method is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
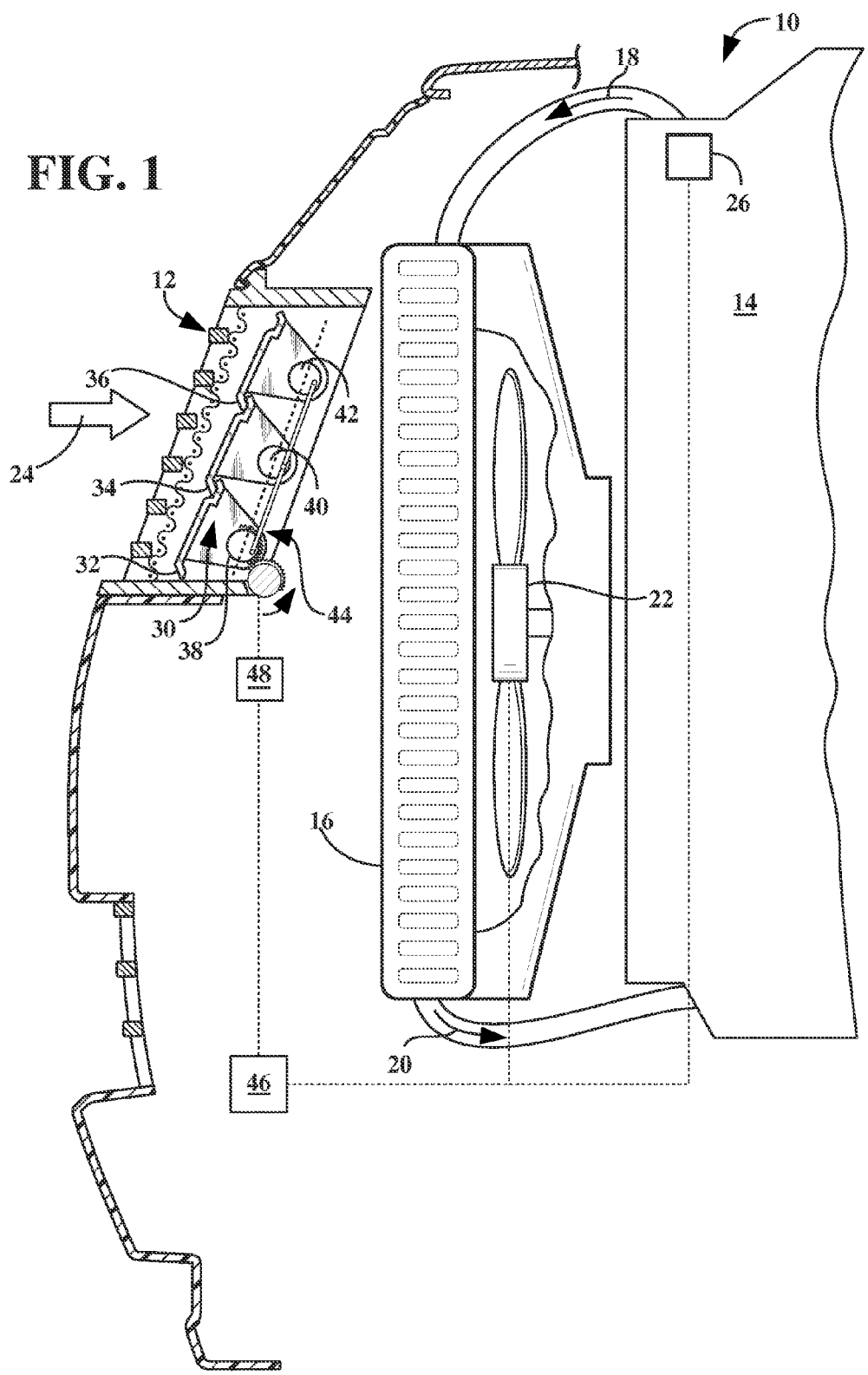
FIG. 1 is a partial side cross-sectional view of a vehicle having an adjustable shutter depicted in a fully-closed state.
Figure 2:
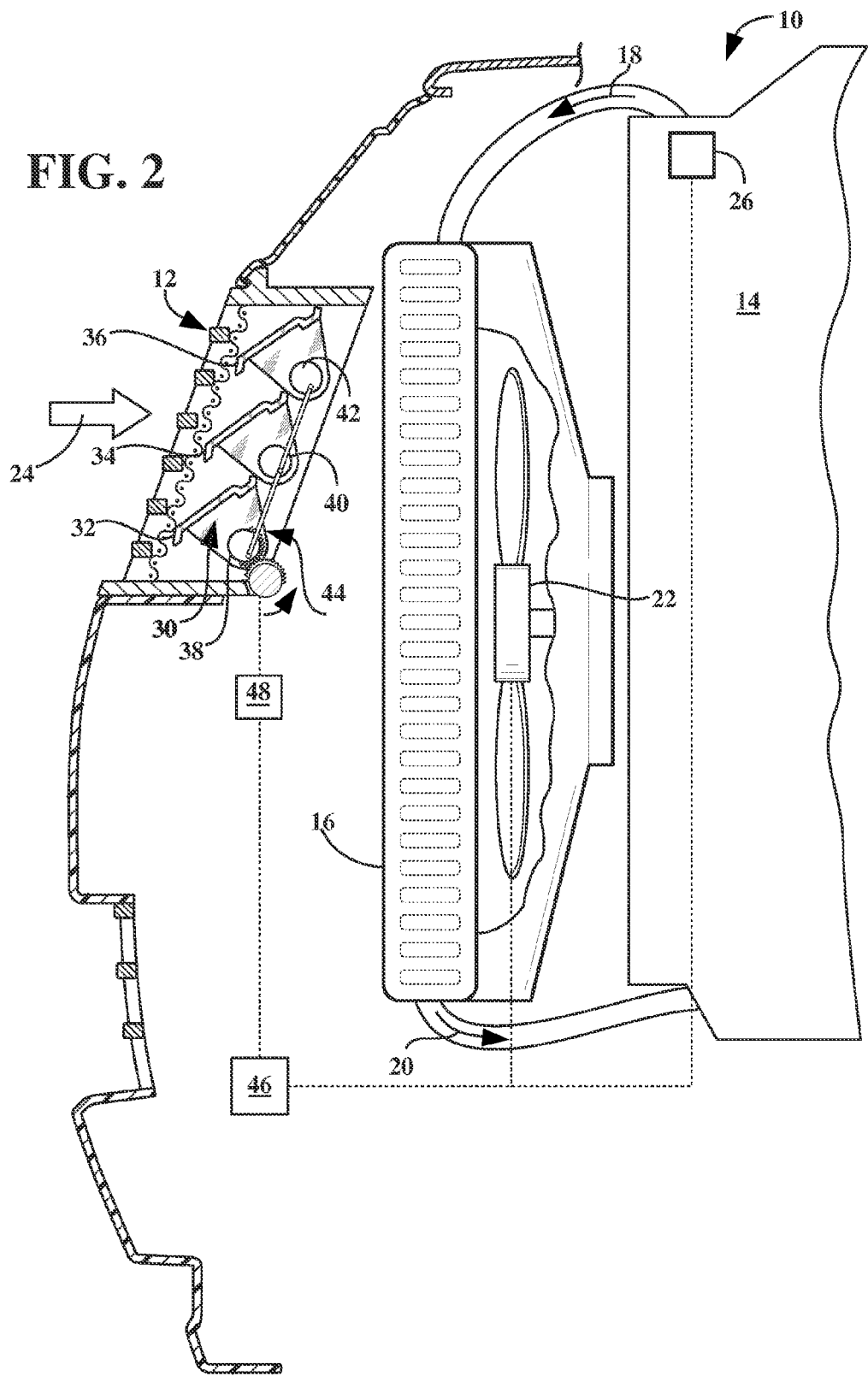
FIG. 2 is a partial side cross-sectional view of a vehicle having the shutter shown in FIG. 1, with the shutter depicted in an intermediate state.
Figure 3:
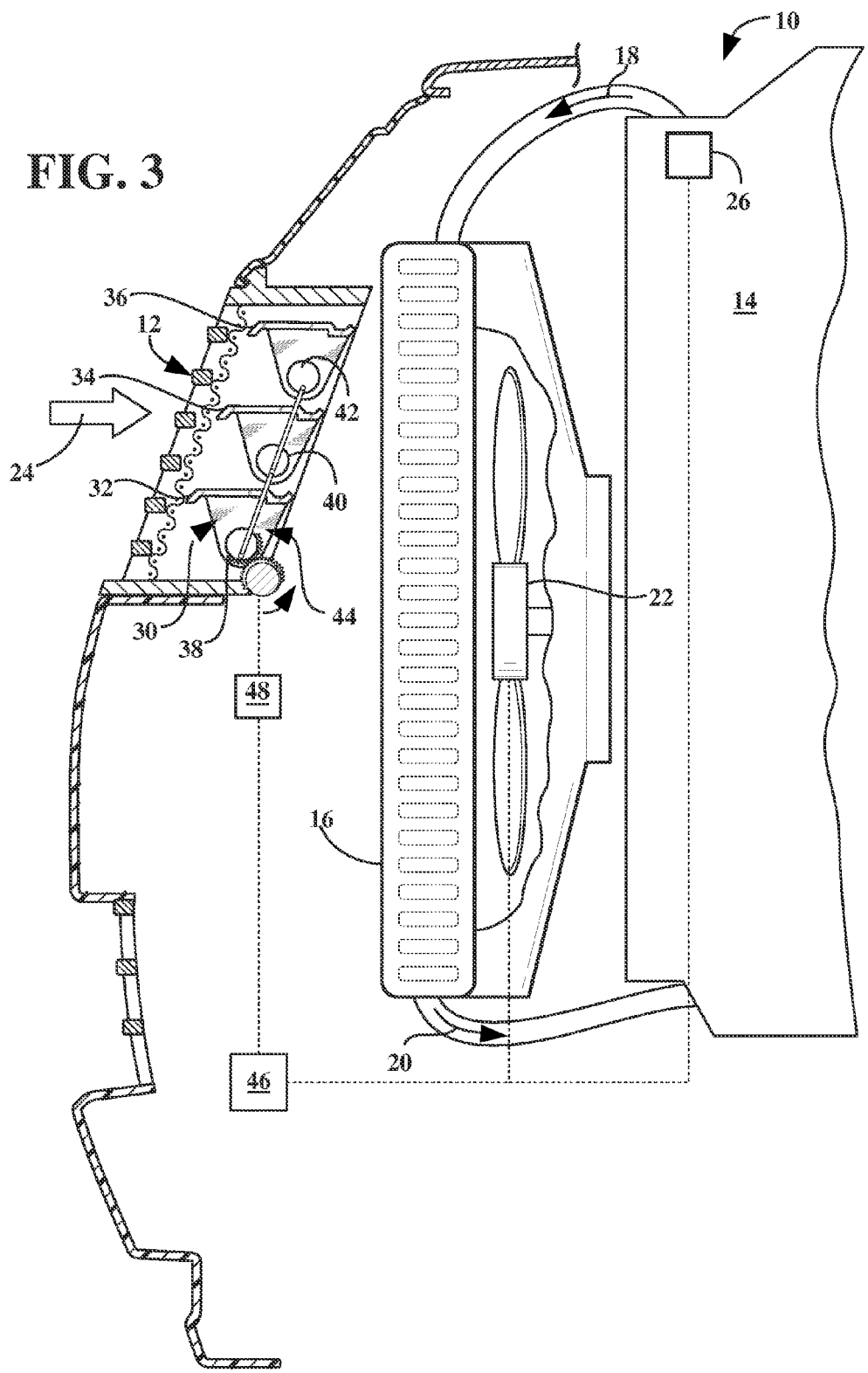
FIG. 3 is a partial side cross-sectional view of a vehicle having the shutter system shown in FIGS. 1 and 2, with the shutter depicted in a fully-opened state.

Referring to the drawings, wherein like reference numbers refer to like components, FIGS. 1-3 show a partial side view of a vehicle 10. The vehicle 10 is shown to include a grille opening 12 typically covered with a mesh. The grille opening 12 is adapted for receiving ambient air. The vehicle 10 additionally includes a powertrain that is specifically represented by an internal combustion engine 14. The powertrain of the vehicle 10 may additionally include a transmission, and, if the vehicle is a hybrid type, one or more motor-generators, none of which is shown, but the existence of which can be appreciated by those skilled in the art. Efficiency of a vehicle powertrain is generally influenced by its design, as well as by the various loads the powertrain sees during its operation.

The vehicle 10 additionally includes an air-to-fluid heat exchanger 16, i.e., a radiator, for circulating a cooling fluid shown by arrows 18 and 20, such as water or a specially formulated coolant, though the engine 14 to remove heat from the engine. A high-temperature coolant entering the heat exchanger 16 is represented by the arrow 18, and a reduced-temperature coolant being returned to the engine is represented by the arrow 20. The heat exchanger 16 is positioned behind the grille opening 12 for protection of the heat exchanger from various road-, and air-borne debris. The heat exchanger 16 may also be positioned in any other location, such as behind a passenger compartment, if, for example, the vehicle has a rear or a mid-engine configuration, as understood by those skilled in the art.

As shown in FIGS. 1-3, a fan 22 is positioned in the vehicle 10, behind the heat exchanger 16, such that the heat exchanger 16 is positioned between the grille opening 12 and the fan. The fan 22 is capable of being selectively turned on and off based on the cooling needs of the engine 14. Depending on the road speed of the vehicle 10, the fan 22 is adapted to either generate or enhance a stream of air or airflow 24 through the grille opening 12, and toward and through the heat exchanger 16. Thus generated or enhanced through the action of the fan 22, the airflow 24 is passed through the heat exchanger 16 to remove heat from the high-temperature coolant 18 before the reduced-temperature coolant 20 is returned to the engine 14. The fan 22 may be driven either electrically, or mechanically, directly by engine 14. The vehicle 10 additionally includes a coolant sensor 26 configured to sense a temperature of the high-temperature coolant 18 as it exits the engine 14.

Because the fan 22 is driven by the engine 14, size of the fan is typically selected based on the smallest fan that in combination with the available grille opening 12 is sufficient to cool the engine during severe or high load conditions imposed on the vehicle 10. Typically, however, when the size of the grille opening 12 is tailored to such severe load conditions, the grille opening generates significant aerodynamic drag on the vehicle which causes a loss in operating efficiency of the engine 14. On the other hand, if the size of the grille opening 12 is chosen based on the aerodynamic and operating efficiency requirements at higher vehicle speeds, the size of the fan 22 that is required to generate sufficient airflow at high load conditions becomes so great, that the fan generates significant parasitic drag on the engine 14. Therefore, an adjustable or variable size for the grille opening 12 would permit the fan 22 to be sized for minimum parasitic drag on the engine 14, while being capable of satisfying the high vehicle load cooling requirements. At the same time, such an adjustable grille opening 12 would permit selection of a smaller fan that would further serve to increase the operating efficiency of the powertrain.

FIGS. 1-3 also depict a rotatable or adjustable shutter 30. The shutter 30 is secured in the vehicle 10 and is adapted to control the airflow 24 through the grille opening 12. As shown, the shutter 30 is positioned behind, and immediately adjacent to the grille opening 12 at the front of the vehicle 10. As shown, the shutter 30 is positioned between the grille opening 12 and the heat exchanger 16. The shutter 30 may also be incorporated into and be integral with the grille opening 12. The shutter 30 includes a plurality of louvers, herein shown as having three individual louver elements 32, 34, and 36, but the number of louvers may either be fewer or greater. Each louver 32, 34, and 36 is configured to rotate about a respective pivot axis 38, 40, and 42 during operation of the shutter 30, thereby effectively controlling the size of the grille opening 12. The shutter 30 is adapted to operate between and inclusive of a fully-closed position or state (as shown in FIG. 1), through an intermediate position (as shown in FIG. 2), and to a fully-opened position (as shown in FIG. 3). When the louver elements 32, 34, and 36 are in any of their open positions, the airflow 24 penetrates the plane of shutter 30 before coming into contact with the heat exchanger 16.

The shutter 30 also includes a mechanism 44 configured to select and lock a desired position for the shutter between and inclusive of fully-opened and fully-closed. The mechanism 44 is configured to cause the louvers 32-36 to rotate in tandem, i.e., substantially in unison, and permitting the shutter 30 to rotate into any of the available positions. The mechanism 44 may be adapted to select and lock either discrete intermediate position(s) of the louvers 32-36, or to infinitely vary position of the louvers between and inclusive of the fully-opened and fully-closed. The mechanism 44 acts to select the desired position for the shutter 30 when activated by any external means, as understood by those skilled in the art, such as an electric motor (not shown). The vehicle 10 also includes a controller 46, which may be an engine controller or a separate control unit, configured to regulate the mechanism 44 for selecting the desired position of the shutter 30. The controller 46 may also be configured to operate the fan 22, if the fan is electrically driven, and a thermostat (not shown) that is configured to regulate the circulation of coolant, as understood by those skilled in the art.

The controller 46 is programmed to regulate the mechanism 44 according to the load on the engine 14 and, correspondingly, to the temperature of the coolant sensed by the sensor 26. The temperature of the high-temperature coolant 18 is increased due to the heat produced by the engine 14 under load. As known by those skilled in the art, a load on the engine is typically dependent on operating conditions imposed on the vehicle 10, such as going up a hill and/or pulling a trailer. The load on the engine 14 generally drives up internal temperature of the engine, which in turn necessitates cooling of the engine for desired performance and reliability. Prior to exiting the engine 14, coolant is routed inside the engine in order to most effectively remove heat from critical engine components, such as bearings (not shown, but known by those skilled in the art). Typically, the coolant is continuously circulated by a fluid pump (not shown) between the engine 14 and the heat exchanger 16.

When the shutter 30 is fully-closed, as depicted in FIG. 1, the louvers 32-36 provide blockage of the airflow 24 at the grille opening 12. A fully-closed shutter 30 provides optimized aerodynamics for the vehicle 10 when engine cooling through the grille opening 12 is not required. The shutter 30 may also be regulated by the controller 46 to variably restrict access of the oncoming airflow 24 to the heat exchanger 16, by rotating the louvers 32-36 to an intermediate position, as shown in FIG. 2, where the louvers are partially closed. An appropriate intermediate position of the louvers 32-36 is selected by the controller 46 according to a programmed algorithm to thereby affect the desired cooling of the engine 14. When the shutter 30 is fully-opened, as shown in FIG. 3, each louver 32-36 is rotated to a position parallel to the airflow 24 seeking to penetrate the shutter system plane. Thus, a fully-opened shutter 30 is configured to permit a generally unfettered passage of such a stream of air through the louver plane of the shutter 30.

Systems, such as the shutter 30, that influence cooling of the engine 14, also affect exhaust emissions generated by the engine. Consequently, the operation of such systems may need to be monitored for compliance with various government rules and regulations, such as On-Board Diagnostics standards (OBD). As known by those skilled in the art, OBD standards require a vehicle to include self-diagnostic and reporting capability for certain key systems. To such an end, the controller 46 is programmed to monitor the operation of the shutter 30 in order to verify that a command from the controller has resulted in the desired response from the shutter.

In accordance with the above requirements, in addition to being adapted to issue a command for the shutter 30 to adopt a position between and inclusive of the fully-closed and fully-opened, the controller 46 is also adapted to assess whether the shutter has adopted the commanded position. Furthermore, the controller 46 is adapted to generate a first signal if the shutter 30 has in fact adopted the commanded position. Accordingly, the first signal is indicative of a "pass" status of the response of the shutter 30, and may be stored by the controller 46 for future access and reference. The controller 46 is also adapted to command the shutter 30 to perform a first retry to adopt the commanded position if the shutter has not adopted the commanded position. Additionally, the controller 46 is adapted to generate a second signal if the shutter has in fact adopted the commanded position on the first retry. Similar to the first signal, the second signal is indicative of a "pass" status of the response of the shutter 30, which may also be stored by the controller 46 for future access and reference.

The controller 46 may be further adapted to command the shutter 30 to perform a second retry via the mechanism 44 to adopt the commanded position if the shutter has not adopted the commanded position on the first retry. The controller 46 may be additionally adapted to assess whether the shutter 30 has adopted the commanded position on the second retry. Furthermore, the controller 46 may be adapted to generate a third signal if the shutter has in fact adopted the commanded position on the second retry. Similar to the first and second signals, the third signal is indicative of a "pass" status of the response of the shutter 30, which may similarly be stored by the controller 46 for future access and reference.

The controller 46 is also adapted to generate a fourth signal if on the second retry the shutter 30 has still failed to adopt the commanded position. Accordingly, the fourth signal is indicative of a "fail" status of the response of the shutter 30, which may be stored by the controller 46 for future access and reference, as may be required for compliance with various government regulations such as the OBD standards. The first through fourth signals may each be an appropriate code that may be communicated and/or stored electronically by the controller 46.

The position of the shutter 30 is changed by the controller 46 generating a command to the mechanism 44, wherein the mechanism may generate a response to the controller with respect to whether the shutter has adopted the commanded position. For the stated purpose of generating such a response, the mechanism 44 may be arranged in operative communication with a processor 48. The processor 48 may either be incorporated into the mechanism 44 or be a stand-alone device. The controller 46 may then be adapted to receive the communication regarding the status of the response of the shutter 30 from the processor 48 in order to generate any of the first through fourth signals.

Ambient temperatures near and below freezing may present considerations for cooling of the powertrain in the vehicle 10. When the ambient temperature is below a predetermined value, i.e., near or below freezing, sufficient cooling of the engine 14 may be achieved with the grille opening 12 either in the partially restricted or in the fully blocked state. At the same time, the louvers 32-36 and the mechanism 44 may freeze and become jammed at such low temperatures. Therefore, in order to prevent jamming of the shutter 30 in some unwanted position, when the ambient temperature is below the predetermined value, an appropriate predetermined position of the shutter 30 may be selected and locked without regard to vehicle speed and load. The grille opening 12 may be placed in any position between and inclusive of the fully-opened and the fully-restricted states via the predetermined position of the shutter 30 depending on the cooling requirements of the powertrain of the vehicle 10. Accordingly, the controller 46 will generate one of the first, second, third, or fourth signals, respectively, if the shutter 30 has adopted the commanded position upon the initial command, on the first or second retry, or has failed to adopt the commanded position following the second retry.

The predetermined locked position or a number of discrete locked positions of the shutter 30 that would still permit sufficient cooling of the powertrain near and below freezing ambient temperatures may be established empirically during testing and development of the vehicle 10. The controller 46 may be employed to monitor the ambient temperature via a temperature sensor (not shown) and regulate and lock the position of the shutter 30 via the mechanism 44 in response to the ambient temperature being below the predetermined value. Full control over the selectable positions of the shutter 30 may then be returned when the ambient temperature again rises above the predetermined value. Once the full control over the selectable positions of the shutter 30 is returned to the controller 46, the controller 46 will again commence assessing whether the shutter 30 has adopted the position that has been commanded to the mechanism 44 during the initial command, or on the first or on the second retries.

Figure 4:
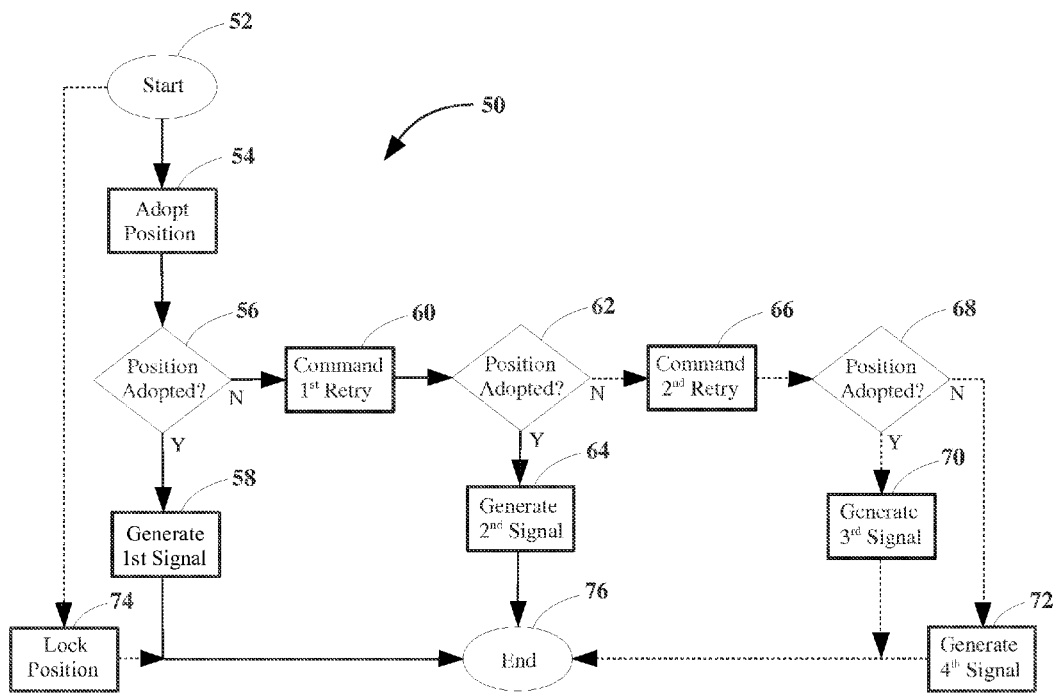
FIG. 4 is a flow chart illustrating a method for monitoring operation of the adjustable shutter depicted in FIGS. 1-3.

FIG. 4 depicts a method 50 for monitoring operation of the adjustable shutter 30, as described above with respect to FIGS. 1-3. The method commences in frame 52 and then proceeds to frame 54 where it includes commanding the shutter 30 to adopt a position via the controller 46. Following frame 54, the method advances to frame 56. In frame 56, the method includes assessing whether the shutter 30 has adopted the commanded position. After frame 56, the method proceeds to frame 58, where the method includes generating the first signal if the shutter has adopted the commanded position.

If in frame 56 it has been determined that the shutter 30 has not adopted the commanded position, the method proceeds to frame 60 where the method includes commanding the shutter to perform a first retry to adopt the commanded position. Following the command in frame 60, the method moves to frame 62 where it again includes assessing whether the shutter 30 has adopted the commanded position. After frame 62, the method proceeds to frame 64, where it includes generating the second signal if the shutter 30 has adopted the commanded position.

If in frame 60 it has been determined that the shutter 30 has still not adopted the commanded position, the method may proceed to frame 66 where the method includes commanding the shutter 30 to perform a second retry to adopt the commanded position. Following the command in frame 66, the method may move to frame 68 where it once again includes assessing whether the shutter 30 has adopted the commanded position. If in frame 68 it has been determined that the shutter 30 has on the second retry adopted the commanded position, the method may additionally proceed to frame 70 where it includes generating the third signal.

On the other hand, if in frame 68 it has been determined that the shutter 30 has not adopted the commanded position despite the first and the second retries, the method may proceed to frame 72. In frame 72, the method includes generating the fourth signal to signify that the shutter has failed to adopt the commanded position.

Additionally, at or near freezing ambient temperatures, the method may proceed directly from frame 52 to frame 74. In frame 74, regardless of vehicle speed, the controller 46 may regulate the mechanism 44 to select and lock the shutter 30 in the predetermined position which may include any of the positions shown in FIGS. 1-3.

The method 50 concludes in frame 76, where the diagnostic procedure of monitoring the operation of the shutter 30 is completed.

While the best modes for carrying out the invention have been described in detail, those familiar with the art to which this invention relates will recognize various alternative designs and embodiments for practicing the invention within the scope of the appended claims.

The invention claimed is:

1. A method of monitoring operation of an adjustable shutter adapted for cooling a powertrain in a vehicle, the method comprising:
   commanding the shutter to adopt a position;
   assessing whether the shutter has adopted the commanded position;
   generating a first signal indicative of a "pass" status of shutter response if the shutter has adopted the commanded position;
   commanding the shutter to perform a first retry to adopt the commanded position without generating a signal indicative of a "fail" status of shutter response if the shutter has not adopted the commanded position; and
   generating a second signal indicative of a "pass" status of shutter response if the shutter has adopted the commanded position on the first retry.

2. The method of claim 1, further comprising commanding the shutter to perform a second retry to adopt the commanded position without generating a signal indicative of a "fail" status of shutter response if the shutter has not adopted the commanded position on the first retry.

3. The method of claim 2, further comprising assessing whether the shutter has adopted the commanded position on the second retry, generating a third signal indicative of a "pass" status of shutter response if the shutter has adopted the commanded position on the second retry, and generating a fourth signal indicative of a "fail" status of shutter response if the shutter has not adopted the commanded position on the second retry.

4. The method of claim 3, wherein each of said commanding the shutter to adopt a position, assessing whether the shutter has adopted the commanded position, generating a first signal if the shutter has adopted the commanded position, commanding the shutter to perform a first retry to adopt the commanded position if the shutter has not adopted the commanded position, generating a second signal if the shutter has adopted the commanded position on the first retry, commanding the shutter to perform a second retry to adopt the commanded position if the shutter has not adopted the commanded position on the first retry, assessing whether the shutter has adopted the commanded position on the second retry and generating a third signal if the shutter has adopted the commanded position on the second retry, and generating a fourth signal if the shutter has not adopted the commanded position on the second retry is accomplished by a controller.

5. The method of claim 4, wherein each of the first, second, third, and fourth signals is stored by the controller.

6. The method of claim 4, the shutter including a mechanism configured to select a position for the shutter between and inclusive of the fully-opened and the fully-closed positions in response to a command from the controller, the method further comprising selecting the shutter position between and inclusive of the fully-opened and the fully-closed in response to the command from the controller.

7. The method of claim 6, wherein the mechanism is in operative communication with a processor, and wherein the processor is adapted to communicate to the controller whether the shutter has one of adopted and not adopted the commanded position.

8. The method of claim 7, wherein the powertrain includes an internal combustion engine and a fan adapted to draw an airflow through the shutter to cool the engine, the method further comprising selectively turning the fan on and off and selecting the shutter positions between and inclusive of the fully-opened and the fully-closed by the controller according to a load on the engine.

9. The method of claim 8, wherein the vehicle includes a heat exchanger and a fluid circulated through the heat exchanger such that the engine is cooled by the fluid, and a sensor configured to sense a temperature of the fluid, the method further comprising cooling the engine by the fluid, sensing the temperature of the fluid by the sensor, and selecting the shutter position between and inclusive of the fully-opened and the fully-closed by the controller according to the sensed temperature of the fluid.

10. The method of claim 1, further comprising monitoring the ambient temperature and selecting and locking a predetermined position for the shutter in response to the ambient temperature being below a predetermined value.

11. The method of claim 1, wherein the shutter is arranged one of integral to the grille opening and adjacent to the grille opening.

* * * * *